(12) United States Patent
Krishnamoorthy

(10) Patent No.: US 6,504,977 B1
(45) Date of Patent: Jan. 7, 2003

(54) INTEGRATED CMOS PIGTAILED RECEIVER USING CMOS-COMPATIBLE OPTICAL BENCH

(75) Inventor: Ashok V. Krishnamoorthy, Middletown, NJ (US)

(73) Assignee: Agere Systems, Inc., Allentown, PA (US)

( * ) Notice: Subject to any disclaimer, the term of this patent is extended or adjusted under 35 U.S.C. 154(b) by 0 days.

(21) Appl. No.: 09/495,305

(22) Filed: Feb. 1, 2000

(51) Int. Cl.$^7$ .................................................. G02B 6/30
(52) U.S. Cl. ............................ 385/49; 385/88; 385/52; 385/14
(58) Field of Search .............................. 385/14, 49, 50, 385/52, 65, 83, 88–93

(56) References Cited

U.S. PATENT DOCUMENTS

| | | | | |
|---|---|---|---|---|
| 4,890,895 A | * | 1/1990 | Zavracky et al. | 385/14 |
| 4,989,934 A | * | 2/1991 | Zavracky et al. | 385/14 |
| 5,208,879 A | * | 5/1993 | Gallo et al. | 385/14 |
| 5,390,271 A | * | 2/1995 | Priest | 385/92 |
| 5,605,856 A | | 2/1997 | Goosen et al. | 437/51 |
| 5,778,127 A | | 7/1998 | Gilliland et al. | 385/92 |
| 5,912,751 A | | 6/1999 | Ford et al. | 359/128 |
| 6,005,262 A | | 12/1999 | Cunningham et al. | 257/84 |
| 6,169,833 B1 | * | 1/2001 | Goossen et al. | 385/49 |

OTHER PUBLICATIONS

Misiakos et al. "Monolithic Integration of Light Emitting Diodes, Detectors, and Optical Fibers on an Silicon Wafer: A CMOS Compatible Otical Sensor" Electron Devices Meeting, 1998. IEDM '98 Technical Digest., International, 1998.*

Goossen and Krishnamoorthy, "Optoelectronics in VLSI Technology", Oral Presentations, Wiley Encyclopaedia of Electrical and Electronics Engineering (John G. Webster, Ed.) pp. 380–95 1999.

Goossen et al., Multiple Attachment GaAs–on–Si Hybrid Optoelectronic/VLSI chips, IEEE LEOS Smart Pixel Topical Meeting, pp. 24–25, 1996.

Goossen et al., "GaAs MQW Modulators Integrated with Silicon CMOS", IEEE Photonics Tech., Letters, vol. 7, No. 4, pp. 360–362 Apr. 1995.

Loinaz et al., "A 200–mW, 3.3–V, CMOS Color Camera IC Producing 352 X 288 24–b Video at 30 Frames/s", IEEE J. Solid State Circuits, vol. 33, No. 12, pp. 2092–2102 Dec. 1998.

Krishnamoorthy et al., "3–D Integration of MQW Modulators Over Active Submicron CMOS Circuits: 375 Mb/s Transimpedance Receiver–Transmitter Circuit" IEEE Photonics Tech, Letters, vol. 7, No. 11, pp. 1288–1290 Nov. 1995.

Woodward and Krishnamoorthy, "1–Gb/s Integrated Optical Detectors and Receivers in Commercial CMOS Technologies", IEEE J. Sel. Topics in Quantum Mechanics, vol. 5, No. 2, pp. 146–156, Mar./Apr. 1999.

* cited by examiner

Primary Examiner—John D. Lee
Assistant Examiner—Sarah U Song

(57) ABSTRACT

The disclosed technique enables fully integrated monolithic hybrid optoelectronic chips to be built that combine electronic circuits, optical devices that are either flip-chip bonded or surface mounted on the VLSI circuits, and fibers. Disclosed is a technique for attaching a fiber optic pigtail to connect a silicon photodetector and a CMOS receiver (or a phototransmitter and a driver) to create a fully integrated CMOS receiver circuit for multimode fiber applications, such as those at a wavelength of about 850 nm. The integrated silicon detector/CMOS receiver can serve as a cheap power/signal monitor (for low speed applications) or even a high-speed Gigabit/s detector.

14 Claims, 3 Drawing Sheets

INTEGRATED CMOS PIGTAILED RECEIVER USING CMOS-COMPATIBLE OPTICAL BENCH

TECHNICAL FIELD

The present invention relates in general to the field of optic communications, and in particular, to a method of integrating a pigtailed CMOS receiver with a CMOS-compatible optical bench, and a device manufactured using the method.

BACKGROUND

Optical transceivers are key components in fiber-optic communication systems. They transmit and receive photonic signals to and from high-speed fiber-optic cables and convert them from and to electronic signals for transmission through non-optical portions of networks and terminal equipment. Low-cost fiber-optical transceivers are now being developed by a number of companies for fiber-optic LAN and data communications markets. The key components in such transceivers include: the transmitter and/or detector device, the driver and/or receiver electronics, and an efficient means for packaging these components together with the optical fiber.

A promising method of making such devices is the Silicon Optical Bench (SiOB) technology described in Bell Labs Research, Dept. BL01-1144, Silicon Optical Bench-GOLD CD '97, March, 1997. This technology provides the ability to etch V-grooves to hold optical wave guide fibers and direct the light to and from the ends of the fibers. Typically, this SiOB technology is then packaged on a second level board that holds the detector and/or laser chips as well as the receiver and/or laser driver electronics. In some cases, an active alignment is needed to align the fiber with the laser because each sits on a separate substrate.

Reducing the number of surfaces and components is a way to reduce the cost and package complexity of optoelectronic (OE) transceivers. To achieve this goal, the prior application disclosed a method of attaching OE devices such as a GaAs light-detector and a light-modulator on a prefabricated silicon CMOS IC. The attachment is preferably done using the well-known flip-chip bonding technique, which provides about 1 $\mu$m alignment accuracy between the OE device and the VLSI circuit, especially when performing reflow after bonding. Despite these advances in the art, a need still exists for a reduction in the number of surfaces and components in order to further reduce the cost and packaging complexity of OE transceivers.

SUMMARY

As used in this application, a fiber-optic "pigtail" is a short optical fiber, typically used to connect fiber optic components such as lasers and couplers.

In one aspect, the present invention is directed toward a fully integrated monolithic hybrid optoelectronic (OE) chip that combines electronic circuits, optical devices that are either flip-chip bonded or surface mounted on the electronic circuits, and fibers. In another aspect, the electronic circuits include a CMOS detector and receiver; or a CMOS transmitter and driver.

In another aspect, the present invention is a technique for attaching fibers to CMOS circuits with a silicon-based detector and receiver to create a fully integrated CMOS receiver for multimode fiber application at 850 nm. The integrated silicon detector and CMOS receiver can serve as a cheap power/signal monitor (for low speed applications) or even a high-speed Gigabit/s detector if the CMOS detector is designed appropriately.

In a first preferred embodiment, the invention is directed toward a fully integrated hybrid monolithic optoelectronic (OE) device comprising: a substrate including: a first CMOS circuit formed on the substrate; a groove, formed within the substrate and in suitable optical alignment with the first CMOS circuit; a second CMOS circuit formed on the substrate; a fiber-optic pigtail of sufficient length communicatively coupling the first CMOS circuit with the second CMOS circuit; and an optical fiber disposed within the groove and affixed to the substrate, wherein the optical fiber is cleaved and coated with a metal to form an angled, mirrored surface. In another aspect, the first CMOS circuit comprises a photodetector and the second CMOS circuit comprises a receiver, or the first CMOS circuit comprises a phototransmitter and the second CMOS circuit comprises a driver. In a yet another aspect, the optical fiber is cleaved at an angle greater than 42°. In a further aspect, the optical fiber is cleaved at an angle sufficient to impart total internal reflection to light emerging from the optical fiber.

In a yet another aspect, the invention is directed toward a fully integrated hybrid monolithic OE device for use in a CMOS color camera; a Local Area Network; for operation in the near-infrared region; at a wavelength of about 850 nm;

In another aspect, the invention is directed toward a fully integrated OE device comprising a light guiding structure such as a ball lens.

In a second preferred embodiment, the invention is directed toward a method of forming a hybrid OE device upon a substrate comprising the steps of forming a first CMOS circuit on the substrate; forming a receiving groove in the substrate such that the receiving groove is in a desirable alignment relative to the first CMOS circuit; disposing an optical fiber within the groove; securing the optical fiber within the groove; cleaving and coating the optical fiber to form an angled, mirrored surface; forming a second CMOS circuit on the substrate; and coupling the second CMOS circuit with the first CMOS circuit with a pigtail connection of sufficient length; wherein a photonic path is formed from the optical fiber to the first CMOS circuit, and an optical path is formed between the first CMOS circuit and the second CMOS circuit. In another aspect, the first CMOS circuit is an optical detector and the second CMOS circuit is a receiver; or the first CMOS circuit is an optical transmitter and the second CMOS circuit is a driver.

BRIEF DESCRIPTION OF THE DRAWINGS

These and other features, objects and advantages of the present invention, can be readily understood from the following detailed description of the presently preferred embodiments and he appended claims with a reference to the accompanying drawings, where like numbers designate like parts, and wherein:

DETAILED DESCRIPTION OF THE PRESENTLY PREFERRED EMBODIMENTS

Figure 1:
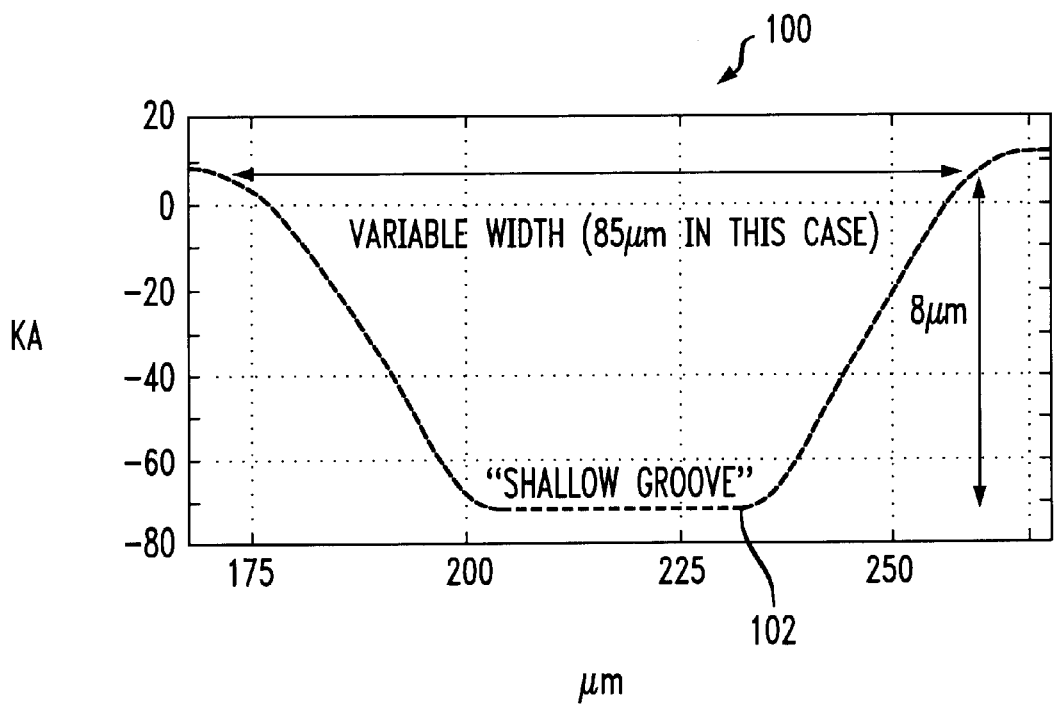
FIG. 1 depicts a surface profile of a CMOS chip substrate, which shows a 6.1 $\mu$m "shallow groove;"

FIG. 1 depicts a surface profile 100 for a CMOS chip (not shown) constructed according to the teachings of a prior commonly-owned and currently pending U.S. patent application Ser. No. 09/235,624, filed Jan. 22, 1999 ("prior application") now U.S. Pat. No. 6,169,833, the disclosure of which application is hereby incorporated by reference in its entirety. The surface profile 100 includes a 6.1 $\mu$m shallow groove 102. Although the width of the shallow groove shown in the figure is relatively narrow, i.e., only 85 $\mu$m, it has been found that such a narrow, shallow groove 102 is sufficient for aligning and securing the optical fiber to the CMOS chip. Furthermore, such a narrow groove permits precise alignment of an optical fiber (not shown in FIG. 1) with on-chip OE devices such as phototransmitters or photoreceivers. Consequently, this method permits direct, precise, on-chip coupling of an optical fiber to OE-VLSI circuits (not shown in FIG. 1) fabricated on the CMOS chip.

Figure 2A:
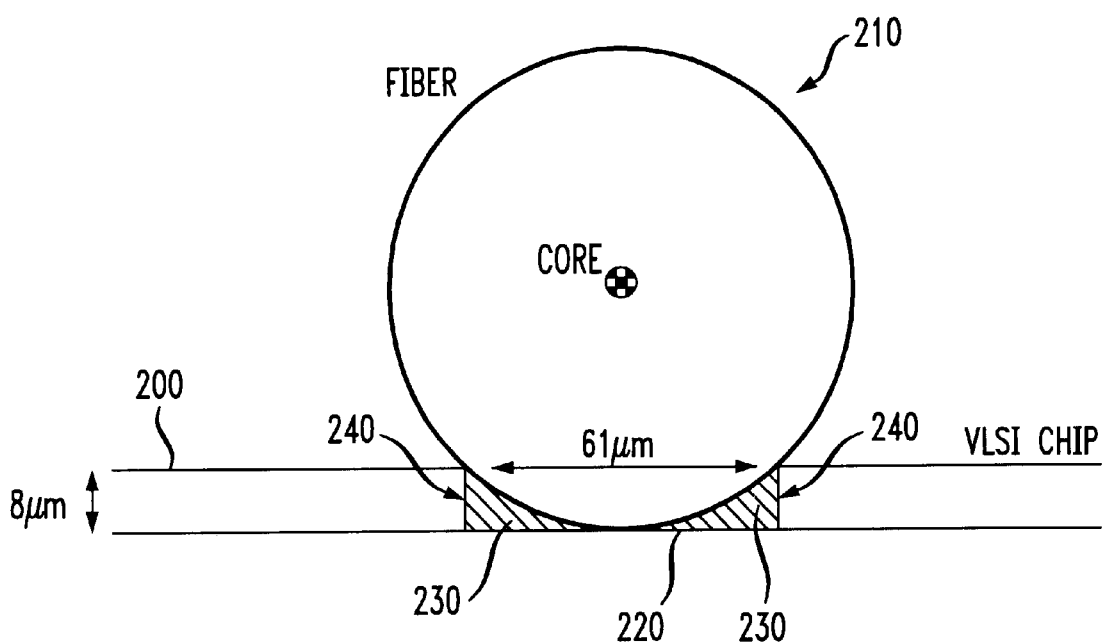
FIG. 2(a) is a cross-sectional view of a CMOS chip surface with a shallow groove with a 125 $\mu$m opitical fiber fixed in place using epoxy.

FIG. 2(a) illustrates the basic principle of a Silicon Optical Bench. Specifically, a VLSI chip 200 shown in cross section in FIG. 2(a) advantageously comprises Silicon, although other materials such as Germanium or ceramics could also be used. Among the advantages of Silicon are ease and economy with which such materials can be manufactured to very close tolerances, due to the existence of highly developed processing techniques that include photolithography and preferential etching. These techniques are well known to persons skilled in the art and, therefore, do not need a detailed review.

Shown further in FIG. 2(a), an optical fiber 210 of about 125 $\mu$m, is positioned within a shallow groove 220 formed within VLSI chip 200. Groove 220 may be formed by a "saw cut lane," 240 created during the processing of chip 200 and used for separating individual chips that may, for example, be processed on a single wafer. Advantageously, groove 220 may be relatively shallow. As an example, groove 220 shown in FIG. 2(a) is approximately 8 microns deep.

Once the fiber 210 is positioned within the groove 220, a suitable adhesive such as an epoxy-type adhesive 230 may be wicked into the groove 220 where it is subsequently allowed to cure, thereby adhering the optical fiber 210 into the groove 220. Persons of ordinary skill in the art will appreciate that many types and formulations of adhesives for securing an optical fiber within the groove are contemplated and within the scope of the present invention.

Figure 2B:
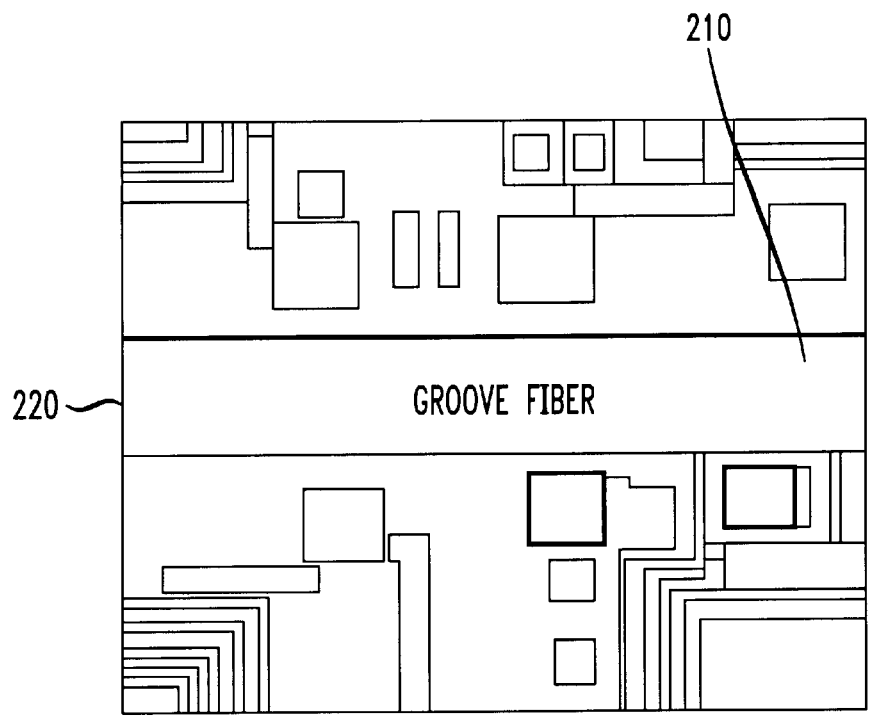
FIG. 2(b) is a microphotograph of a CMOS wafer with a 125 $\mu$m optical fiber bonded thereto.
Figure 2C:
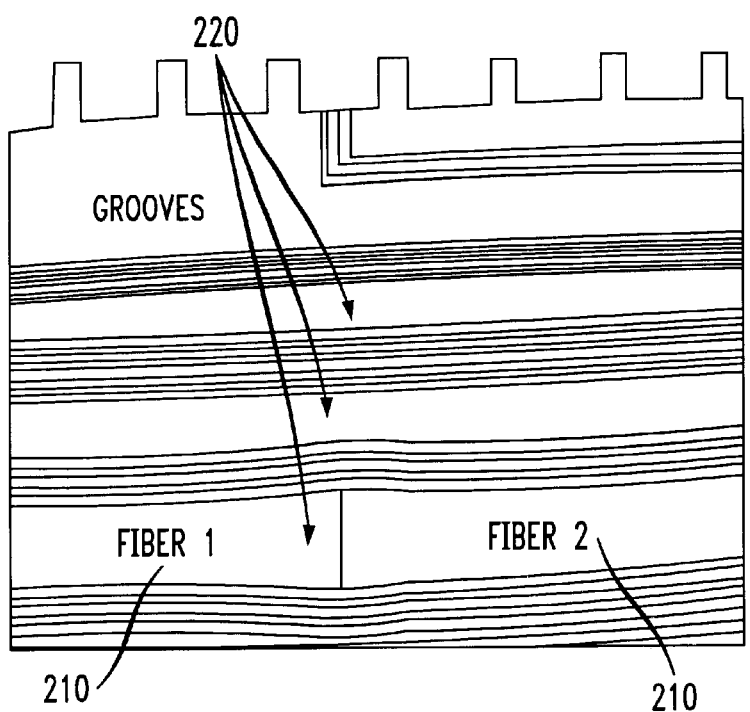
FIG. 2(c) is a close-up microphotograph of the CMOS wafer of FIG. 2(b)

The prior application disclosed a method of aligning, placing, and attaching a fiber directly to the CMOS chip 200 using alignment features and grooves defined during the CMOS fabrication process. This enabled the CMOS chip 200 to be used as the integration substrate, thereby allowing other devices to be fabricated thereon. It was shown that the optical fiber 210 can be disposed in the shallow groove and affixed in position in a suitable optical alignment with an OE device such as a photodetector or a phototransmitter (not shown in FIG. 2) by a suitable adhesive such as epoxy, thereby forming an integrated OE-VLSI package. Several alternative configurations of the integrated OE-VLSI device have also been disclosed therein.

In order to produce a receiver or power monitor, it was stated in the prior application that it was necessary to provide a GaAs detector flip-chip-bonded to the CMOS chip that contained the receiver circuit. A flip-chip-bonded detector typically requires surface-normal incidence, which is usually accomplished by bending light rays (90° bend) so as to properly illuminate the detector. These 90° bends are difficult to accomplish using refraction. Therefore, the prior methods used a larger bend radius and illuminate the detector at an angle. This, however, results in a longer optical path. These problems—of how to provide a surface normal incidence to an optical signal, and how to accomplish this without elongating the optical path—resulted in a large diameter of the optical beam and large optical losses from multiple reflections and diffraction.

The present invention overcomes these problems and enables hybrid OE chips to be built that combine electronic circuits, optical devices that are either flip-chip-bonded or surface mounted on the VLSI circuits, and fibers. In particular, an improvement in the art and a technical advance are achieved by integrating an entire receiver and/or transmitter on the same CMOS chip 200 as well. Accordingly, the previously stated technique for attaching a fiber to a CMOS circuit can be advantageously combined with a silicon-based detector and receiver to create a fully integrated CMOS receiver for multimode fiber application, for example, in a local area network that operates at a wavelength of 850 nm. The integrated silicon detector and CMOS receiver thus created serves as a cheap power/signal monitor (for low speed applications) or even a high-speed Gigabit/s detector if the CMOS detector is designed appropriately.

Figure 3:
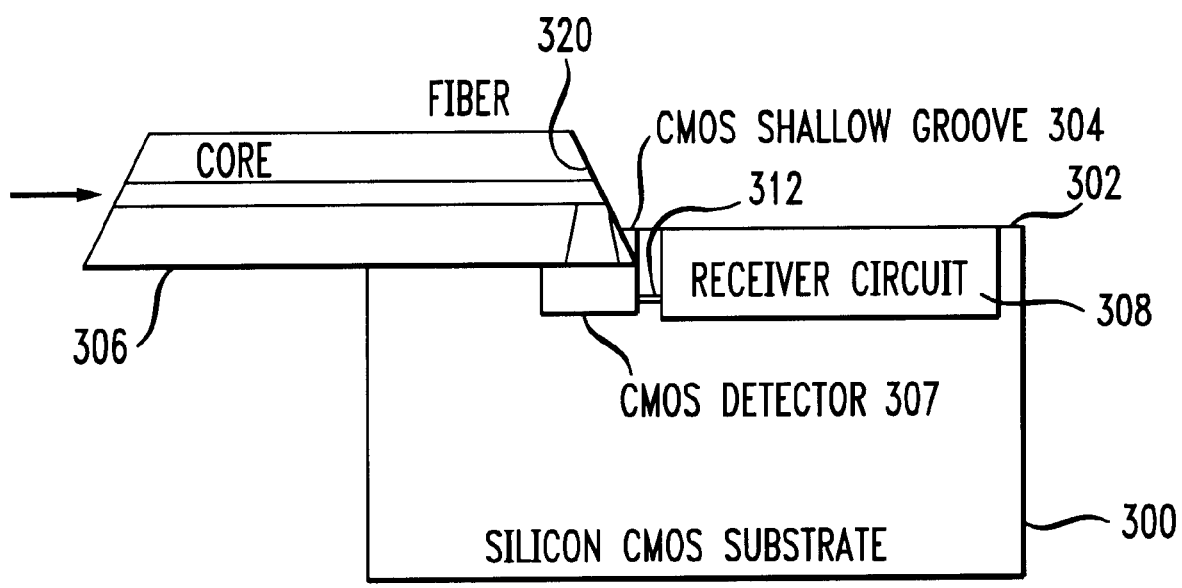
FIG. 3 is a cross-sectional view of a CMOS chip surface comprising a "shallow groove" and a CMOS detector with cleaved and metal-coated fiber fixed in place using epoxy.

Referring to FIG. 3, a Silicon CMOS chip substrate 300 comprises a top surface 302 upon which a shallow groove 304 is defined as described in the prior application. Commercial CMOS technologies do not provide a deep etch (such as a125 $\mu$m etch) that can be used to define V-grooves as part of their process. But they provide a set of mask levels that can be used to define and etch a shallow groove with a depth of about 8 microns with sub-micron accuracy, such as the shallow groove 304. If properly designed and fabricated, this depth is sufficient to position a bare fiber 306 as shown. The bare fiber 306 comprises a light-carrying core and a cladding portion.

It has been discovered that a CMOS receiver circuit 308 that uses a silicon CMOS based detector 307 can be built together with the CMOS receiver 308. The CMOS based detector 307 structure is preferably designed as part of the shallow groove 304 at an extreme end at which an edge of the bare fiber 306 is positioned as shown.

This procedure advances the art by eliminating the need for a GaAs or other type of detector to be attached to the CMOS chip substrate 300 using a flip-chip method as understood traditionally. The fiber 306 is then cleaved and coated with a metal to define an angled, mirrored surface 320. This angled, mirrored surface 320 enables light emerging from the fiber 306 to be sufficiently bent and directly illuminate the CMOS detector 307 suitably positioned at the edge of the shallow groove 304. The CMOS receiver circuit 308 is placed in close proximty and is coupled to the CMOS detector 307 using a pigtail connection 312. Preferably, this pigtail connection 312 is an optical fiber core. In a preferred embodiment, the pigtail connection is of sufficient length to establish an optical path between the CMOS detector 307 and the receiver circuit 308.

In other embodiments, it is possible to achieve total internal reflection and bend the light emerging from the fiber 306 into the Silicon CMOS substrate 300. This is advantageously accomplished by cleaving the fiber 306 at an angle such that the fiber-to air interface angle (not shown in FIG.

3) is greater than 42°. In further embodiments, as can be readily appreciated by persons skilled in the art, when using multimode-fibers, a superior reflection and efficiency can be achieved by coating an exposed end facet of a cleaved fiber with a suitable metal.

Since silicon is capable of light detection in the near-infrared region, which is a preferred communication wavelength (~850 nm) for local-area-network or (LAN) applications. Persons skilled in the art also know how to make all-CMOS based receivers (with Silicon CMOS-compatible detectors) that operate in excess of 1 Gigabit/s. Such detectors could then be integrated as part of the shallow-groove to make a low-cost, high-speed pigtailed communications receiver for LAN applications. Therefore, the present invented technique can be advantageously used to produce a pigtailed 850 nm receiver for LAN applications using a fiber and a CMOS chip with no other optical or mechanical components.

Additional areas of application for the principles of the present invention include the manufacture of highly sensitive detector/receivers made with CMOS for color camera IC applications. Thus, the use of this CMOS optical bench technique together with the CMOS detectors can desirably be used to make a low-cost pigtailed receiver for monitoring, power-meter, and even camera applications preferably by using fiber image guides instead of single-mode or multimode fibers.

The foregoing describes a method of forming an integrated CMOS pigtailed receiver using a CMOS optical bench technology. Various additional modifications of this invention will occur to those of ordinary skill in the art without deviating from the spirit and scope of the invention. In particular, alternative methods for forming the shallow grooves, alternative adhesives, OE circuits and alternative optical fiber compositions are contemplated. Further, light-guiding structures such as ball lenses can be affixed using the same procedure. Additionally, some techniques and applications are described in the publications referenced below, which publications are incorporated by reference herein in their entireties. All such deviations from the specific teachings of this specification that basically rely upon the principles disclosed and their equivalents through which the state of the art has been advanced are properly considered within the scope of the invention as described and claimed.

Publications:
1. A. V. Krishnamoorthy, et al., "3-D Integration of MQW Modulators Over Active Submicron CMOS Circuits: 375 Mb/s Transimpedance Receiver-Transmitter Circuit," *IEEE Photonics Technology Letters*, Vol. 7, No. 11, pp. 1288–90, November 1995.
2. T. K. Woodward and A. V. Krishnamoorthy, "1 Gigabit/s Integrated Optical Detectors and Receivers in Commercial CMOS technologies," *IEEE J Selected Topics in Quantum Electronics*, Vol. 5, No.2, pp. 146–156, March 1999.
3. K. W. Goossen, et al., "GaAs MQW Modulators Integrated with Silicon CMOS," *IEEE Photonics Technology Letters*, Vol. 7, No. 4, pp. 360–62, April 1995.
4. K. Goossen, et al., "Multiple attachment GaAs-on-Si hybrid optoelectronic/VLSI chips" *Proc. 1996 LEOS Topical Meeting on Smart Pixels*, p. 24, Keystone, August 1996.
5. M. Loinaz, et al., "A 200-mW, 3.3V, CMOS Color Camera IC Producing 352×288 24-b Video at 30 Frames/s", *IEEE Journal of Solid-State Circuits*, Vol. 33, No. 12, December 1998, pp. 2092–2103.

What is claimed is:

1. A fully integrated hybrid monolithic optoelectronic (OE) device comprising:
   a substrate including:
      a first CMOS circuit formed on the substrate;
      a groove, formed within the substrate and in suitable optical alignment with the first CMOS circuit;
      a second CMOS circuit formed on the substrate;
      a fiber-optic pigtail of sufficient length communicatively coupling the first CMOS circuit with the second CMOS circuit; and
      an optical fiber disposed within the groove and affixed to the substrate,
   wherein the optical fiber is cleaved and coated with a metal to form an angled, mirrored surface.

2. The OE device according to claim 1, wherein the first CMOS circuit comprises a photodetector and the second CMOS circuit comprises a receiver.

3. The OE device according to claim 1, wherein the first CMOS circuit comprises a phototransmitter and the second CMOS circuit comprises a driver.

4. The OE device according to claim 1 wherein the optical fiber is cleaved at an angle greater than 42°.

5. The OE device according to claim 1 wherein the optical fiber is cleaved at an angle sufficient to impart total internal reflection to light emerging from the optical fiber.

6. The OE device according to claim 1 for use in a CMOS color camera.

7. The OE device of claim 1 for use in a Local Area Network application.

8. The OE device of claim 1 for operation in the near-infrared region.

9. The OE device of claim 1 for operation at a wavelength of about 850 nm.

10. The OE device of claim 1, further comprising a light-guiding structure.

11. The OE device of claim 10, wherein the light-guiding structure is a ball lens.

12. A method of forming a hybrid optoelectronic device upon a substrate comprising the steps of:
   forming a first CMOS circuit on the substrate;
   forming a receiving groove in the substrate such that the receiving groove is in a desirable alignment relative to the first CMOS circuit;
   disposing an optical fiber within the groove;
   securing the optical fiber within the groove;
   cleaving and coating the optical fiber to form an angled, mirrored surface;
   forming a second CMOS circuit on the substrate; and
   coupling the second CMOS circuit with the first CMOS circuit with a pigtail connection of sufficient length;
   wherein a photonic path is formed from the optical fiber to the first CMOS circuit, and an optical path is formed between the first CMOS circuit and the second CMOS circuit.

13. The method of claim 12 wherein the first CMOS circuit is an optical detector and the second CMOS circuit is a receiver.

14. The method of claim 12 wherein the first CMOS circuit is an optical transmitter and the second CMOS circuit is a driver.

* * * * *